(12) United States Patent
Shelby et al.

(10) Patent No.: US 8,898,268 B2
(45) Date of Patent: *Nov. 25, 2014

(54) METHOD AND APPARATUS FOR NETWORK MANAGEMENT

(75) Inventors: Zachary Shelby, Sotkamo (FI); Szymon Sasin, Oulu (FI); Mikko Saarnivala, Oulu (FI)

(73) Assignee: Arm Finland Oy, Oulu (FI)

( * ) Notice: Subject to any disclaimer, the term of this patent is extended or adjusted under 35 U.S.C. 154(b) by 837 days.

This patent is subject to a terminal disclaimer.

(21) Appl. No.: 13/015,700

(22) Filed: Jan. 28, 2011

(65) Prior Publication Data

US 2012/0198037 A1    Aug. 2, 2012

(51) Int. Cl.
  *G06F 15/173*  (2006.01)
  *H04L 12/24*  (2006.01)
  *H04W 4/00*  (2009.01)

(52) U.S. Cl.
  CPC .......... *H04L 41/0213* (2013.01); *H04W 4/005* (2013.01); *H04L 41/0253* (2013.01); *H04W 4/001* (2013.01)
  USPC ............................ 709/223; 709/224; 709/225

(58) Field of Classification Search
  CPC ......... H04L 41/00; H04L 41/50; H04L 43/04; G06F 11/362
  See application file for complete search history.

(56) References Cited

U.S. PATENT DOCUMENTS

| 6,167,448 A | 12/2000 | Hemphill et al. |
| 8,149,748 B2 * | 4/2012 | Bata et al. ...................... 370/311 |
| 2005/0246716 A1 * | 11/2005 | Smith et al. ................... 719/315 |
| 2007/0291727 A1 * | 12/2007 | Hellum et al. ................. 370/345 |

FOREIGN PATENT DOCUMENTS

| JP | 2002-0051796 | 6/2002 |
| WO | 2010/055209 | 5/2010 |

OTHER PUBLICATIONS

IETF CoRE Working Group Intenet-Draft, "Constrained Application Protocol (CoAP) Draft-Letf-Core-Coap-04", 20110124 Internet Engineering Task Force, retrieved Sep. 19, 2011, pp. 1-17.
Finnish Search Report dated Sep. 22, 2011.

* cited by examiner

*Primary Examiner* — Umar Cheema
(74) *Attorney, Agent, or Firm* — Barnes & Thornburg LLP

(57) ABSTRACT

The invention relates to a method and an apparatus for managing network infrastructure. The apparatus comprises a binary web service interface (210) to communicate with resource nodes operationally connected to the apparatus using a binary web service; a resource directory (212) to store a registry of the resource nodes; a data cache (214) for caching information related to resource nodes; and an interface (206) for managing resource nodes, configured to receive Simple Network Management Protocol requests regarding the resource nodes, communicate with the binary web service interface (210) and respond to the request on the basis of the communication with the binary web service interface; and a controller (204) to coordinate the operation of the apparatus.

14 Claims, 5 Drawing Sheets

METHOD AND APPARATUS FOR NETWORK MANAGEMENT

FIELD

The invention relates to a method and an apparatus for network management. In particular, the invention relates to managing network infrastructure in networks comprising machine-to machine systems.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

In modern communication and computer networks, management of network infrastructure equipment, such as personal computers, servers and printers, is an important part of the operation of the network. In a large network comprising tens and hundreds of devices the management of devices requires a systematical approach to be efficient or even possible. Today, the management of infrastructure is performed using standards like the Simple Network Management Protocol (SNMP) and Netconf. These protocols enable the monitoring and possible control of devices connected to the network in a controlled and efficient manner. These methods work well in an Ethernet-based office information technology (IT) environment comprising devices having processor power. Power consumption, traffic overhead and implementation complexity are not a concern in this environment.

Enterprises are rapidly connecting Machine-to-Machine (M2M) systems into their backend IT infrastructure for e.g. energy monitoring, remote machine monitoring, building automation and asset management. M2M systems often include very simple, cheap, battery powered devices connected via deep low-bandwidth access networks. The scale of devices in an M2M network is also massively different, including even up to millions of devices in a single management domain.

Traditional IT system network management solutions and existing protocols like SNMP are too inefficient and complex to managing M2M systems end-to-end. Present solutions are not designed for deep networks, and extremely large numbers of devices with small processing power and minimum power consumption.

Thus, Machine-to-Machine systems today tend to use specialized legacy or proprietary management solutions. Partly this is a result of many M2M systems not being based on IP protocols, however the trend for proprietary protocols has continued even when IP-based networking is available.

BRIEF DESCRIPTION

An object of the invention is to provide an improved solution for managing network infrastructure in networks comprising machine-to machine systems.

According to an aspect of the present invention, there is provided an apparatus, comprising a binary web service interface to communicate with resource nodes operationally connected to the apparatus using a binary web service; a resource directory to store a registry of the resource nodes; a data cache for caching information related to resource nodes; and an interface for managing resource nodes, configured to receive Simple Network Management Protocol requests regarding the resource nodes, communicate with the binary web service interface and respond to the request on the basis of the communication with the binary web service interface; and a controller to coordinate the operation of the apparatus.

According to another aspect of the present invention, there is provided a method for managing resource nodes, comprising: communicating with resource nodes using a binary web service; storing a registry of the resource nodes in a resource directory; caching information related to resource nodes in a data cache; receiving Simple Network Management Protocol requests regarding data related to the resource nodes by an interface, obtaining the requested data from the cache or from the nodes and responding to the request by sending the requested data.

According to an aspect of the present invention, there is provided an apparatus, comprising means for communicating with resource nodes using a binary web service; means for storing a registry of the resource nodes; means for caching information related to resource nodes in a data cache; means for receiving Simple Network Management Protocol requests regarding data related to the resource nodes, means for obtaining the requested data from the cache or from the nodes and means for responding to the request by sending the requested data.

LIST OF DRAWINGS

Embodiments of the present invention are described below, by way of example only, with reference to the accompanying drawings, in which FIG. 1 illustrates an example of a network management system architecture to which embodiments of the invention may be applied;

DESCRIPTION OF EMBODIMENTS

Figure 1:
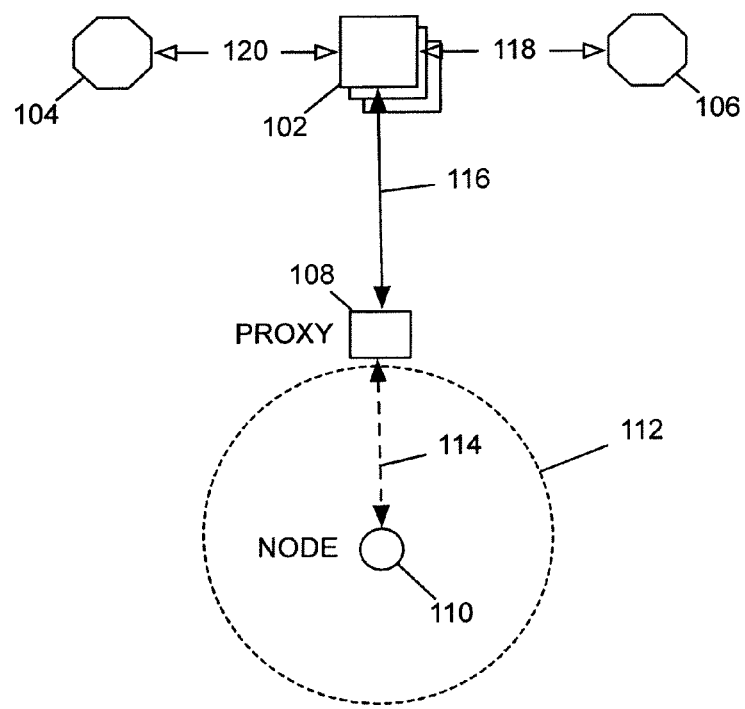

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/ server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

An embodiment of the invention describes a network management system (NMS) for Machine-to-Machine applications where data and management information is being collected from constrained devices over typically constrained networks like GPRS or IEEE 802.15.4. Instead of managing such a network using proprietary User Datagram Protocol (UDP) based protocols or SNMP, an innovative binary Web Service approach is utilized. Three mechanisms related to network management are introduced: resource registration and discovery, proxy SNMP, and domain management.

FIG. 1 illustrates an example of a network management system architecture to which embodiments of the invention may be applied.

The architecture consists of a Network Management System NMS Server 102, which hosts backend components of the NMS system. Such an NMS server can be realized on anything from a standard personal computer (PC) to a server cloud. The NMS server components can be located on the same apparatus, or distributed across a cluster. Embodiments of the invention are designed to scale from small M2M systems (1000s of nodes) to very large M2M systems (100s of millions of nodes). The NMS Server 102 provides an interface through which NMS management information can be accessed by Web Service clients 104 using standard HTTP web service protocols 120 such as REST. Furthermore, embodiments of the invention allow the same management information to be accessed also by standard SNMP management tools 106 using standard SNMP 118.

The embedded M2M devices or resource nodes 110 that are being managed by the NMS server 102 can be connected to the server via IP 116 either directly or via an intermediate web service proxy 108. The interfaces between the node, proxy and server 114, 116 are realized using a binary web service protocol over IP. In an embodiment, the intermediate proxy 108 may help in the registration process, provide extra security, and do intermediate web resource caching on behalf of nodes. The M2M devices 110 reside in a constrained network 112 over which traditional management protocols would be too inefficient. The constrained or low-power wireless network 110 may be a multihop network comprising a set of wireless low-power nodes. In this simplified example, one node 110 is illustrated.

In an embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

The embedded M2M devices or resource nodes 110 are configured to implement an NMS client and one or more Management Information Bases (MIB). Management Information Bases are used in SNMP to define the structure of the management data of a resource.

Figure 2:
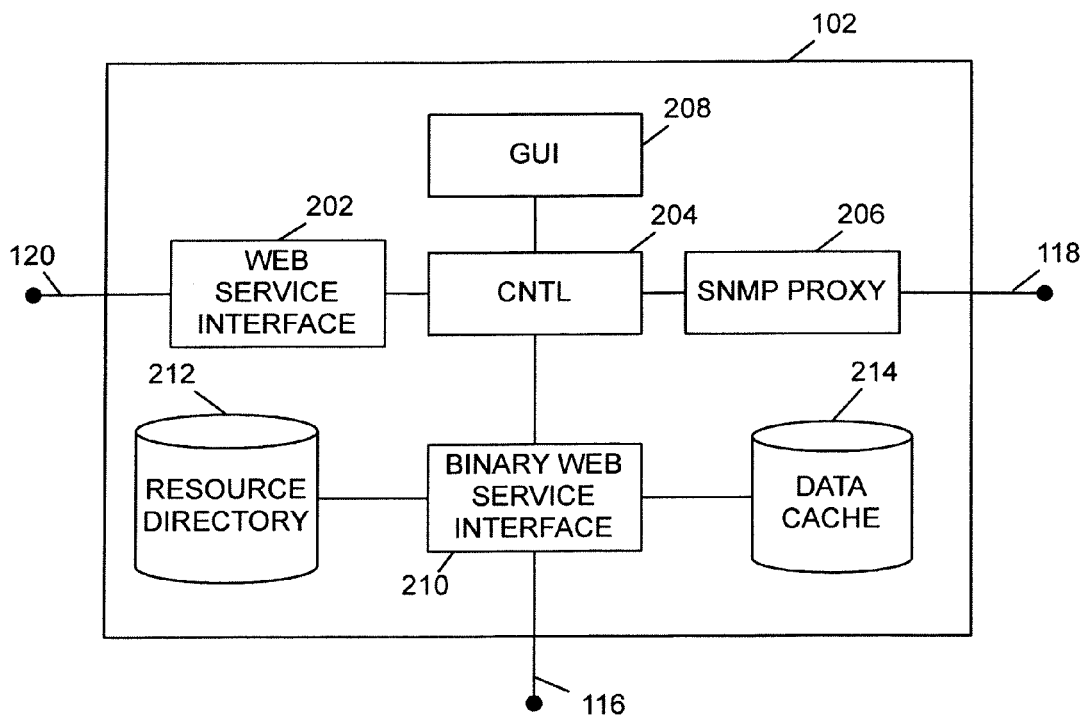
FIG. 2 illustrates an example of a network management system server.

FIG. 2 illustrates an example of a NMS server 102. The server may consist of several components. A control function 204 is configured to coordinate the components and act as an enterprise message bus. The server comprises a binary web service interface 210 which is operationally connected to the control function and configured implement client and server functions of web service interfaces and provide load balancing and domain functions. The binary web service interface may be also responsible for maintaining a web resource data cache 214 and a resource directory 212. The web resource data cache 214 is used for temporarily caching management resources received by the NMS server. This caching greatly improves efficiency as subsequent requests for that resource are fetched internally rather than loading the constrained M2M network. The resource directory 212 is a registry of all the resources in the M2M network. The directory is used to collect resource registrations from M2M nodes at bootstrap time, and it provides resource discovery for the other NMS components. This way the resource directory 212 eliminates the need for management tools to probe the M2M network directly (which is very inefficient).

The server further comprises an SNMP Proxy component 206 which is configured to act as an SNMP Agent for any SNMP management tool that may connect to the NMS server via SNMP interface 118. The SNMP Agent is configured to discover management resources (which have MIB naming) from the resource directory 212, and generate a virtual management information base. This virtual MIB represents all the nodes in the M2M network and their MIBs. Thus, a direct contact with each node using SNMP is not needed. When the SNMP Proxy 202 receives a request regarding a MIB object, the proxy is configured to make an internal resource request from the binary web service interface 210. If the resource is already in the data cache 214, a response may be returned immediately. The same management information is made available via a web service interface 202. This is usually accessed via a RESTful HTTP interface 120 where any web server or browser can discover resources from the resource directory 212, and then request them using the URLs discovered. If the URL is found from the cache, a response may be returned directly. Otherwise the resource is requested from the relevant M2M node.

In an embodiment, the SNMP proxy and web service interface communicate with outside world using standard "non-binary" protocols. The binary web service interface may be configured to communicate with nodes using a binary protocol such as CoAP requests. The units of the NMS server communicate internally using Application Program Interface (API) calls which are protocol independent. Thus HTTP, SNMP and CoAP protocols end at their respective interface components. When the SNMP component needs a resource, it is configured to inquire the front-end for the resource using an internal API call. If the front-end doesn't have a cached version, it is configured to initiate a CoAP request. Thus in an embodiment, the NMS server is configured to act more like a resource broker than a protocol converter.

In an embodiment, the NMS server may comprise a graphical user interface 208 so that a system administrator to manage the system, for example. This interface may be provided natively, or via a local web page over HTTP.

In addition to being used for accessing management resources, the NMS server 102 may also be used to register and access application data resources in a similar fashion. The only difference is that non-management resources are not available via the SNMP Proxy interface. Management resources refer to information such as the number of IP packets in/out of a radio interface. Application resources refer to information such as the temperature of a sensor, or a servo that is actuated. SNMP is not used to access application resources as Management Information Bases are not an effective tool for getting such information from resource nodes.

Let us next study a resource registration and discovery mechanism for network management. In traditional network management using SNMP, an SNMP network manager continuously probes a Local Area Network for nodes to manage and to discover which Management Information Bases are available. However, M2M applications are often made up of deep Wide Area Networks over very constrained links often with long delays. In such environment, traditional SNMP management does not work efficiently.

In an embodiment, M2M nodes 110, the NMS server 102 and possible proxies 108 are configured to execute a resource registration and discovery mechanism suitable for constrained networks. In an embodiment, information objects or resources to be managed on a node are represented as web resources. Resources of the nodes may be defined as Uniform Resource Identifier web resource structure. A web resource is identified by a Uniform Resource Locator (URL). A Uniform Resource Locator is a Uniform Resource Identifier (URI) that specifies where a resource is available and the mechanism for retrieving the resource. An example of an URL is the address of a web page on the World Wide Web, such as http://www.example.com/.

The discovery mechanism starts with a resource node 110 sending a registration message to the resource directory 212 of the NMS server 102. The node learns the IP address of the resource directory in any number of ways, including pre-configuration, anycast addresses or multicast resource discovery. The registration mechanism may be realized as a web service interface, with the node sending its registration using a POST or PUT method. The registration information is modeled as a list of web links, each describing a resource of the node (resource descriptions). This list of links is hosted by the node as a resource itself, e.g. on a URL such as "/links". These resource descriptions could be represented in any number of link formats, including Atom, HTML links or the HTTP link header format. In addition to the URL of the link, each resource description contains possible metadata about the resource, for example its semantic name, interface description, identification (ID) and content-type. In an embodiment, resource descriptions use naming specific to management with the SNMP Proxy mechanism. The registration may also be used for other management and M2M application resources.

An example resource description for a node 110 with SNMP management resources in HTTP link header format might look like:

```
</mib/1.3.6.1.2.1.1.3>; name="IPv6-MIB"; type="MIB",
</mib/1.3.6.1.2.1.4.2>; name="UDP-MIB"; type="MIB";
```

In order to register these resource descriptions with the NMS server 102, the node 110 POSTs or PUTs the resource to a well-known URL on the NMS server. The resources may be stored in a directory named "/links", for example. In an embodiment, metadata about the node is included in the query string of the registration request. The pseudo web-service operation would look like:

```
Request: POST rd.nms.example.org/links?name=
node1.example.org&id=a21f Content-Type: application/link-
format
Payload:
</mib/1.3.6.1.2.1.1.3>; name="IPv6-MIB"; type="MIB",
</mib/1.3.6.1.2.1.4.2>; name="UDP-MIB"; type="MIB";
Response: 200 OK Location: /links/node1.example.org
```

Above, payload is a resource description in HTTP link header format. In the payload, the URL of the resource in defined between brackets "< >". The name-field is a descriptive name of the resource, in the case of management the MIB. The type-field describes that this is an SNMP MIB.

When this is received by the resource directory, it either updates an existing entry matching the name, ID or IP address of the node, or creates a new entry. The entry contains node metadata, each of the resource descriptions, along with entry control metadata. The entry control metadata includes node state, which can be either ACTIVE or STALE. An entry comprising STALE state is not used by the resource directory for lookup or resource access. The node in STALE state is considered temporarily unreachable.

The resource directory generates the node state internally. When a node first performs registration it is given ACTIVE state. If no activity (active triggers) or new registrations from the node are received within a given timeout (STALE_TIMEOUT), then the node is moved to STALE state. In addition, an interface may be provided for e.g. a router to tell the resource directory if a node has become unreachable or again reachable.

Constrained M2M nodes may often disappear from M2M networks due to battery loss, breakage or network problems. For that reason the resource directory entries need to be refreshed periodically. In an embodiment, the refreshing can be done in one of three ways: a node may update the entry by POSTing to its entry URL, the NMS server may update the entry by doing a GET to the URL of the node, as defined in the "/links" directory, or triggers may be used without requiring communication with the node.

In an embodiment, triggers are used to maintain entries in ACTIVE state, or to mark entries as STALE if a node is no longer active. This solution has a significant advantage over prior art as it does not load the constrained network nor drain node battery life of the nodes. The resource directory keeps two timers associated with each entry, a stale timer and a garbage collection timer. For a node in ACTIVE state, if no active triggers or new registrations from/about a node are received within a first given time (STALE_TIME), the node is marked STALE. For a node in STALE state, if no triggers or new registrations from/about a node are received within a second given time (GARBAGE_COLLECT_TIMER), the node entry is removed.

Figure 5:
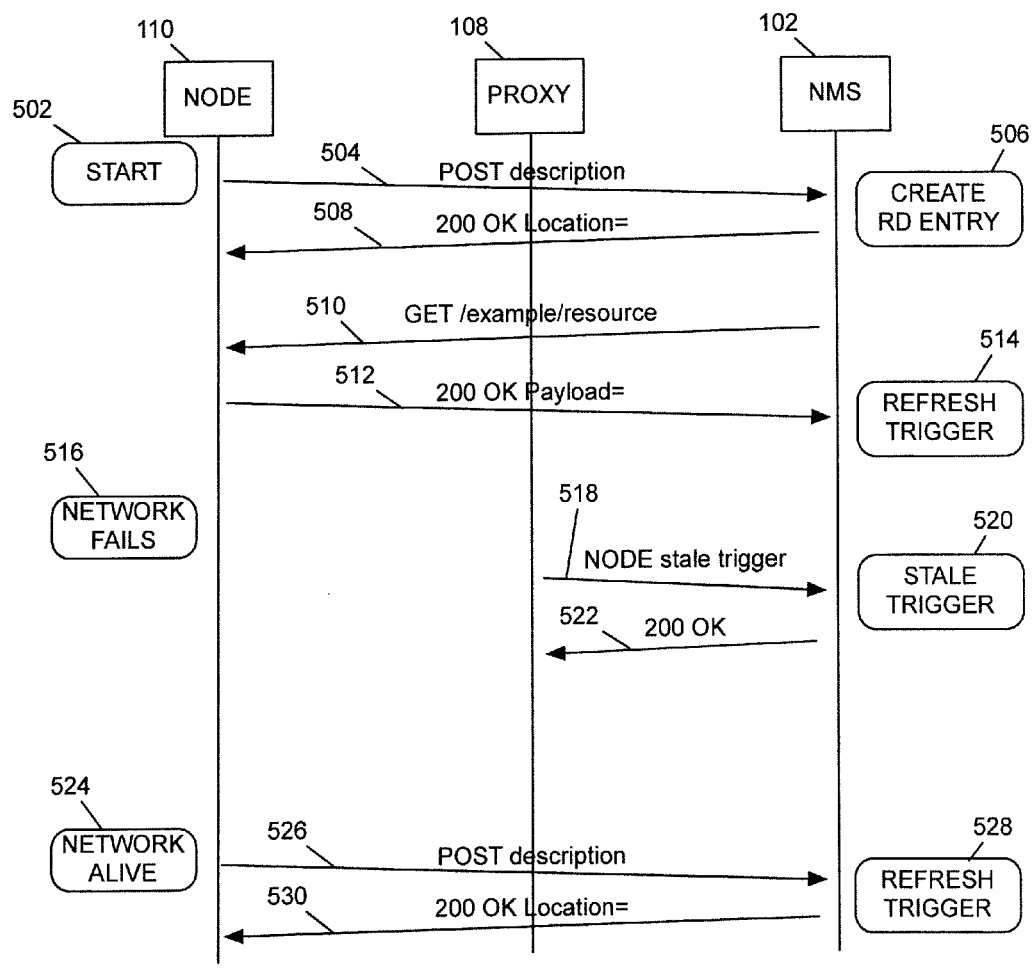
FIG. 5 is a signaling chart illustrating an embodiment of invention.

FIG. 5 is a signaling chart illustrating an embodiment of invention. The chart illustrates node registration process, including the trigger mechanism. The process starts at 502. When an M2M node 110 first boots onto the NMS server 102, it sends 504 a resource registration message by POSTing its resource descriptions for example to the "/links" URL.

The NMS server is configured to respond either with failure (e.g. authentication failed), or a 200 OK message 508 with the location of the node entry under "/links".

If the registration was successful the resource directory of the NMS server is configured to create 506 an entry for the node in ACTIVE state. The SNMP proxy and web interface components of the server 102 will continuously query the resource directory for information about nodes and resources (using an internal bus or interface). Entries in ACTIVE state are available for queries.

The NMS server uses data traffic to refresh the stale timer of a node's resource directory entry. The NMS is configured to request 510 a resource. The reception of a successful response 512 causes a REFRESH trigger 514 to the resource directory, which resets the stale timer.

In some cases a part of the network might fail 516 or a node may disappear from a network subnet. If a proxy 108 is placed at a place with network status information available it is configured to send a STALE trigger 518 about the node(s) in question, marking them with STALE state 520. An acknowledgement 522 may be sent to the Proxy.

Entries are kept in STALE state for a duration determined by GARBAGE_COLLECT_TIMER. Periodically the resource directory may be configured to perform garbage collection removing old stale entries. When a node comes on-line again 524, the resource directory can recover the entry by either receiving an ACTIVE trigger from a proxy, when the node sends data, or by the node re-registering with the resource directory 526, 528, 530.

Figure 3:
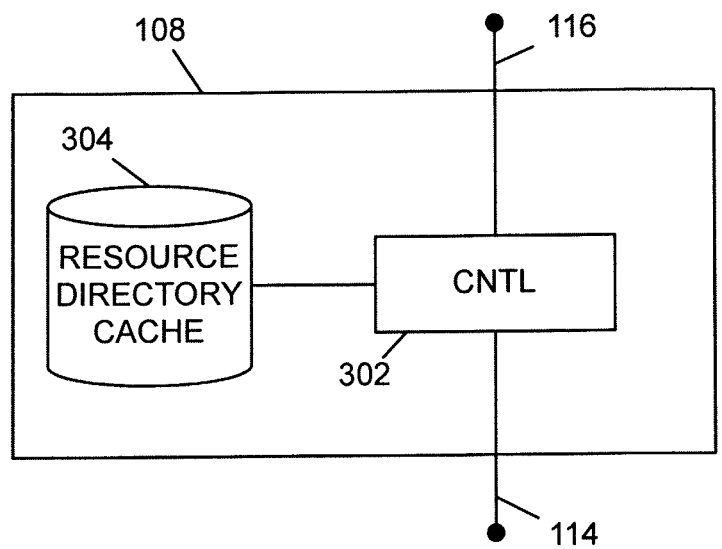
FIG. 3 illustrates an example of the intermediate web service proxy.

FIG. 3 illustrates an example of the intermediate web service proxy 108. The optional intermediate proxy 108 may be configured to act as a web proxy between the NMS server 102 and M2M resource nodes 110. The proxy may be placed on a router at the edge of a cell 112 of nodes, for example. However, the proxy may situate further away from the nodes as well. The proxy 108 comprises two or more IP network interfaces 114, 116. One interface 116 is directed to the NMS server 102. One or more interfaces 114 are directed to the resource nodes 110.

In an embodiment, the proxy 108 comprises a control logic 302 configured to handle interception of binary web service traffic on its IP network interfaces 114, 116. The control logic is configured to provide assistance in the resource registration process of the resource nodes. For this purpose the proxy may comprise a resource directory cache 304. The cache holds resource registration information for the nodes 110 under the proxy 108. Subsequently, the proxy may be configured to maintain the registrations on behalf of the nodes with the NMS server. The proxy 108 may also use the cache 304 in order to cache management resources on behalf of nodes in order to reduce network load on the constrained network. In an embodiment, the proxy may provide important security functions such as reducing denial-of-service risk, performing access control or providing extra security with the NMS across the Internet. In this context, denial-of-service means overloading a resource node with too many simultaneous requests. A proxy may throttle the amount of traffic that actually makes it to a constrained node.

Figure 4:
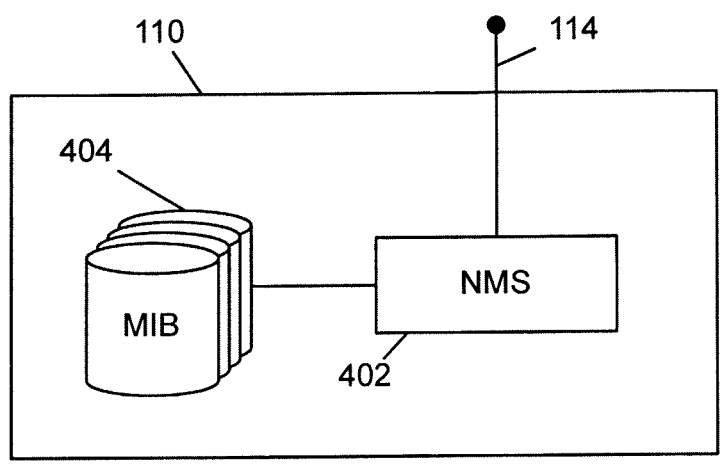
FIG. 4 illustrates an example of a resource node 110 that is managed by the network management system.

FIG. 4 illustrates an example of a resource node 110 that is managed by the NMS server 102. The node 110 in a system managed by the NMS server is typically a constrained M2M device comprising an IP communication interface 114. The node may be a 6LoWPAN sensor node or a GSM based M2M modem. In an embodiment, the entire node is realized in the SIM card of GSM equipment. The node comprises an NMS client 402 configured to implement a binary web service protocol over the IP stack. The NMS client 402 may further be configured to act as a binary web service client and server. The node may comprise Management Information Bases 404 configured to store URLs for each of the management objects it has attached. These MIBs 404 are organized in fashion compatible with standard SNMP MIB structures. However, instead of being identified by the Object ID (OID) as in prior art SNMP, they are identified by URLs. The NMS client 402 may further be configured to be responsible for registering its resource entry points (top level MIB resource URLs) with the NMS server 102 either directly or via the proxy 108.

In addition to serving management resources, the NMS client 402 will usually also be used for registering and serving normal M2M application resources. The components of the resource node responsible for the application resources, such as sensors, are not illustrated in FIG. 4 for simplicity.

In the NMS server 102, the SNMP proxy 206 is a component that acts as an SNMP Agent and translates incoming SNMP messages for managed resources into web resource requests. It is configured to communicate with nodes through the binary web service protocol via the binary web service interface 210. In an embodiment, the SNMP Proxy 206 is configured to use the data cache 214 to prevent unnecessary network load and to be able to respond in case of sleeping nodes.

Figure 6:
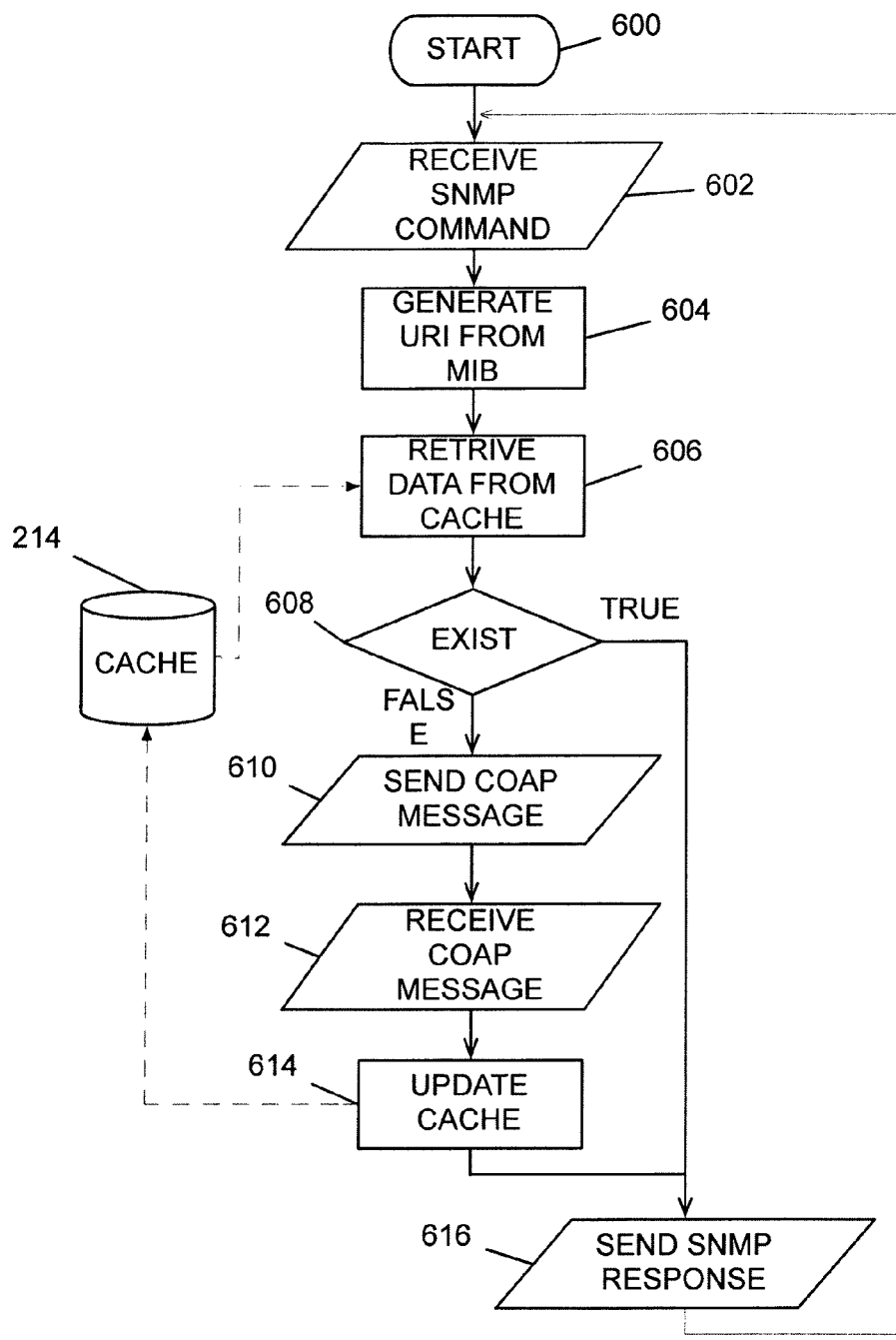
FIG. 6 is a flow chart illustrating an embodiment of invention.

FIG. 6 is a flow chart illustrating an embodiment of invention. The chart illustrates and example of the operation of the proxy component. The example starts at step 600.

In step 602, the SNMP Proxy 206 receives an SNMP command requesting a resource. The request comprises the SNMP identification of the resource, the MIB Object ID (OID).

In order to communicate with a node, the SNMP Proxy generates in step 604 a URI from MIB Object IDs (OIDs). For example, the OID 1.3.6.1.2.1.1.3 is converted to URI: /mib/1.3.6.1.2.1.1.3

In step 606, the SNMP Proxy is configured to check whether the data cache 214 of the NMS server 102 comprises data related to the requested resource. The Proxy ties to retrieve data from the data cache using the generated URI by sending a query to the binary web service interface 210.

If requested data exists 608 in the cache 214, then the binary web service interface sends the requested value to the Proxy. The Proxy is able to send a SNMP response in step 616.

Otherwise, the Proxy is configured to communicate 610 with the node via the binary web service interface 210 by sending a binary message to the node, the message comprising a request for data.

In step 612, the Proxy receives via the binary web service interface 210 a binary web message comprising a reply to the request.

In step 614, the Proxy is configured to update the cache 214 with the received data.

Finally, the Proxy sends an SNMP response in step 616.

Figure 7:
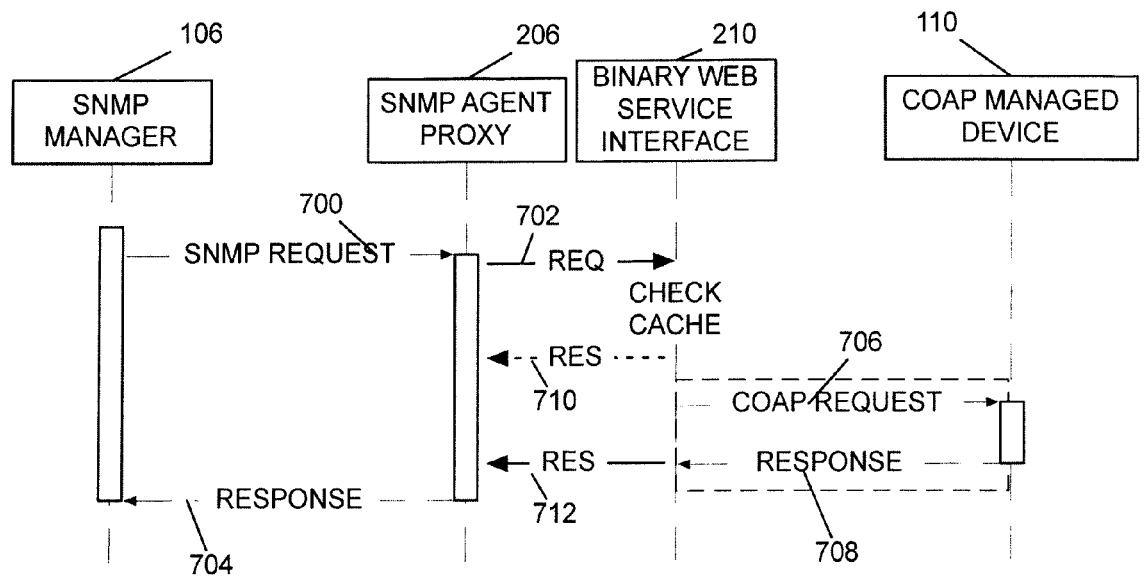
FIG. 7 illustrates an example of a messaging sequence.

FIG. 7 illustrates an example of a messaging sequence between the NMS Server 102, the SNMP Proxy agent 206 and the constrained node 110.

The NMS server 102 receives the SNMP request and forwards 700 it to the SNMP Proxy 206.

The Proxy sends the binary web service interface 210 a request 702 regarding the requested data. The interface first tries to retrieve the requested data from the data cache. If data is found, the data is sent back to the proxy in a response 710. Otherwise, the binary web service interface 210 sends a request 706 to the node 110.

The node is configured to send a binary web service message 708 comprising a reply to the request. The interface sends 712 the response to the Proxy, after which the Proxy is configured to send a response 704.

In an embodiment, the SNMP Proxy 206 first tries to obtain data from cache. If cache is empty, the Proxy requests the data from the node. These messages may be sent via the binary web service interface 210.

The payload type in binary web service messages for management is carried either as XML or in ASN.1 BER (Abstract Syntax Notation One Basic Encoding Rules) in an equivalent way to an SNMP payload. In the case of XML resources, the SNMP Proxy will then translate to the appropriate ASN.1 BER format when providing responses to SNMP requests. Other payload types could be carried, but require suitable translation (e.g. text/plain).

The SNMP proxy is configured to model the entire M2M system as an array of virtual SNMP agents using the SNMP Community Name function (Conext Name in SNMPv3 terminology). Under the "public" Community Name, the SNMP Agent offers an Entity MIB with a logical array of entities, each of which represents a node. Each entry describes a node's metadata, which MIB resources it has, and includes its community name, which can be its name, ID or IP address collected during registration. The SNMP management tool 106 then makes a new SNMP request setting the community name of the node to manage. In an embodiment, the SNMP proxy is configured to support reactive and proactive management. In reactive management, every time the Proxy has SNMP request it does a resource request (which might be available from the cache). In proactive management, binary web service subscriptions are utilized. The Proxy is configured to subscribe to web resources a priori. Thus the data cache 214 is updated every time a resource has been changed. This way whenever an SNMP request is made for a proactive managed resource, the value is always in the cache.

In a small M2M system, all management data might be in the same trust and administrative domain. However, in large enterprise M2M systems, there may be several domains of information that need to be kept separate. However, several domains may be joined even by a single M2M node. In an embodiment, a mechanism for domain management is proposed. The mechanism utilizes URI authority components to separate web service requests, and directs them to virtual servers on the NMS server 102 or the node. The domain management does not have an effect on the communication interface 116 which works as previously described; it is an IP interface running binary web services.

In an embodiment, when domain management is enabled, each web service request includes a URI authority component in addition to the URI path. The syntax of a URI may be constructed as scheme://authority/path?query#fragment. For example, one domain would be called A and another B. M2M nodes may belong to different domains or one node may have data belonging to different domains. When a node related to domain A registers with the NMS Server, it would send a request:

POST a.nms.example.org/links

The "a" in the request defines the domain A. The address nms.example.org/link" defines the address and directory of the node entry. The "a.nms.example.org" entry corresponds to the authority field and /links" entry corresponds to the path field and "name=node1.example.org" entry corresponds to the query field. The fragment field is not used.

Figure 8:
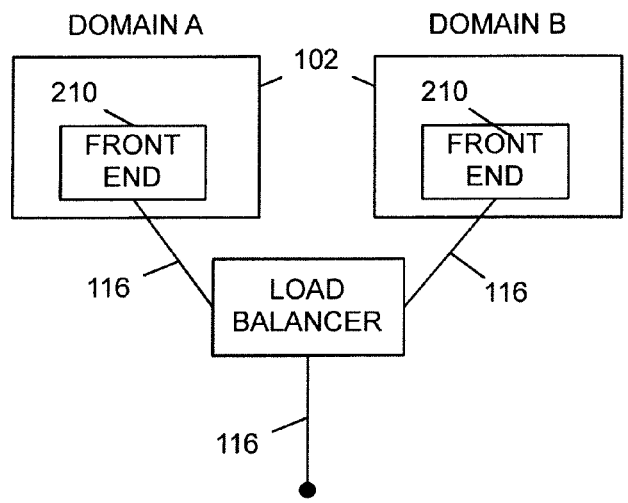
FIG. 8 illustrates an embodiment of network management system architecture dealing with multiple domains.

FIG. 8 illustrates an embodiment of NMS architecture dealing with multiple domains. Here we assume that there exist two domains, domain A and domain B. The NMS architecture may comprise a load balancer 802 associated with both authorities (both domain names resolve to the IP address of the load balancer). When the load balancer 802 receives a request, it checks the authority of the request for a domain, and then forwards the request to the NMS server 102 handling that domain. In an embodiment, here is a default domain for requests with no domain.

Likewise, a node may support multiple domains, keeping the URL space of requests marked with domain A separate from those marked with domain B. These domains are usually related to a different secure identity to authenticate that requests are meant for the correct domain.

In an embodiment, the apparatus implementing aspects of the invention may be realized as software in a server, a computer or a set of computers connected to Internet and a binary web service domain directly or via a proxy router or server.

An embodiment provides a computer program embodied on a distribution medium, comprising program instructions which, when loaded into an electronic apparatus, execute a computer process, the process comprising: communicating with resource nodes using a binary web service; storing a registry of the resource nodes in a resource directory; caching information related to resource nodes in a data cache; receiving Simple Network Management Protocol requests regarding data related to the resource nodes by an interface, obtaining the requested data from the cache or from the nodes and responding to the request by sending the requested data.

The computer program may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   a binary web service interface to communicate with resource nodes operationally connected to the apparatus using a binary web service;
   a resource directory to store a registry of the resource nodes;
   a data cache for caching information related to resource nodes;
   an interface for managing resource nodes, configured to receive Simple Network Management Protocol requests regarding the resource nodes, communicate with the binary web service interface and respond to the request on the basis of the communication with the binary web service interface; and
   a controller to coordinate the operation of the apparatus,
   wherein the apparatus is configured to define resources of the nodes as a Uniform Resource Identifier web resource structure, and
   wherein the resources of the nodes operationally connected to the apparatus belong to more than one domain, wherein the apparatus is configured to separate resources of different domains using a different Authority component for each domain in Uniform Resource Identifier path.

2. The apparatus of claim 1, further comprising a web service interface configured to receive Hypertext Transfer Protocol requests regarding the resource nodes, communicate with the binary web service interface and respond to the request on the basis of the communication with the binary web service interface.

3. The apparatus of claim 1, wherein the apparatus is configured to receive a POST or PUT web message from a node operationally connected to the apparatus, the message comprising information on the resources on the node; store the received information as entries in the resource directory; and denote the state of the entry as active.

4. The apparatus of claim 3, wherein the apparatus is further configured to denote the state of the entry as stale if no activity regarding the entry has been detected within a first given timeout period.

5. The apparatus of claim 3, wherein the apparatus is further configured to delete an entry from the resource directory note the state of the entry as stale if no activity regarding the entry has been detected within a second given timeout period.

6. The apparatus of claim 1, wherein the interface is configured to receive Simple Network Management Protocol request regarding a resource node, request data related to the resource node from a data cache via the binary web service interface; receive requested data from the binary web service interface if the data was found in the cache and respond to the request; request data related to the resource node from the node via the binary web service interface if the data was not found in the cache; receive requested data from the node via the binary web service interface and respond to the request.

7. A method for managing resource nodes, the method comprising:
   communicating with resource nodes using a binary web service;
   storing a registry of the resource nodes in a resource directory;
   caching information related to resource nodes in a data cache;
   receiving Simple Network Management Protocol requests regarding data related to the resource nodes by an interface;
   obtaining the requested data from the cache or from the nodes;
   responding to the request by sending the requested data; and
   defining resources of the nodes as a Uniform Resource Identifier web resource structure,
   wherein the resources of the nodes operationally connected to the apparatus belong to more than one domain, and the resources of different domains are separated using a different Authority component for each domain in Uniform Resource Identifier path.

8. The method of claim 7, further comprising: receiving Hypertext Transfer Protocol requests regarding the resource nodes, obtaining the requested data from the cache or from the nodes and responding to the request by sending the requested data.

9. The method of claim 7, further comprising: receiving a POST or PUT web message from a node, the message comprising information on the resources on the node; storing the received information as entries in the resource directory; and denoting the state of the entry as active.

10. The method of claim 7, further comprising: denoting the state of the entry as stale if no activity regarding the entry has been detected within a first given timeout period.

11. The method of claim 9, further comprising: deleting an entry from the resource directory note the state of the entry as stale if no activity regarding the entry has been detected within a second given timeout period.

12. The method of claim 7, further comprising: receiving Simple Network Management Protocol request regarding a resource node, requesting data related to the resource node from a data cache; receiving requested data if the data was found in the cache and responding to the request; requesting data related to the resource node from the node if the data was not found in the cache; receive requested data from the node and respond to the request.

13. A non-transitory, computer program distribution medium readable by a computer and encoding a computer program of instructions for executing a computer process carrying out a method comprising:
   communicating with resource nodes using a binary web service;
   storing a registry of the resource nodes in a resource directory;
   caching information related to resource nodes in a data cache;
   receiving Simple Network Management Protocol requests regarding data related to the resource nodes by an interface;
   obtaining the requested data from the cache or from the nodes; and
   responding to the request by sending the requested data; and
   defining resources of the nodes as a Uniform Resource Identifier web resource structure,
   wherein the resources of the nodes operationally connected to the apparatus belong to more than one domain, and the resources of different domains are separated using a different Authority component for each domain in Uniform Resource Identifier path.

14. The non-transitory, computer program distribution medium of claim 13, the non-transitory distribution medium including at least one of the following media: a non-transitory computer readable medium, a non-transitory program storage medium, a non-transitory record medium, a non-transitory computer readable memory, a non-transitory computer readable software distribution package, and a non-transitory computer readable compressed software package.

* * * * *